United States Patent
Qi et al.

(10) Patent No.: US 10,060,034 B2
(45) Date of Patent: Aug. 28, 2018

(54) ELECTROLESS COPPER PLATING COMPOSITIONS

(71) Applicant: Rohm and Haas Electronic Materials LLC, Marlborough, MA (US)

(72) Inventors: Meng Qi, Hong Kong (HK); Sze Wei Chum, Hong Kong (HK); Ping Ling Li, Hong Kong (HK)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 0 days.

(21) Appl. No.: 15/412,464

(22) Filed: Jan. 23, 2017

(65) Prior Publication Data

US 2018/0209048 A1    Jul. 26, 2018

(51) Int. Cl.
| | |
|---|---|
| C23C 18/38 | (2006.01) |
| C23C 18/40 | (2006.01) |
| C09D 1/00 | (2006.01) |
| C09D 7/12 | (2006.01) |
| C09D 7/48 | (2018.01) |

(52) U.S. Cl.
CPC .............. *C23C 18/38* (2013.01); *C09D 1/00* (2013.01); *C09D 7/1241* (2013.01); *C09D 7/48* (2018.01); *C23C 18/40* (2013.01); *C23C 18/405* (2013.01)

(58) Field of Classification Search
CPC ............. H01M 4/0404; H01M 4/0409; H01M 4/0419; H01M 4/0471; H01M 4/131; H01M 4/1391; H01M 4/485; H01M 4/505; H01M 4/525; H01M 4/622; H01M 4/625; H01M 4/661; H01M 10/0525; H01M 2004/028; C23C 18/38; C23C 18/40; C23C 18/405; C09D 7/48; C09D 7/1241; C09D 1/00
See application file for complete search history.

(56) References Cited

U.S. PATENT DOCUMENTS

| | | | |
|---|---|---|---|
| 3,095,309 A | 6/1963 | Zeblisky et al. | |
| 3,222,195 A | 12/1965 | Pearlstein | |
| 3,257,215 A | 6/1966 | Schneble, Jr. et al. | |
| 3,310,430 A * | 3/1967 | Schneble, Jr. .......... | C23C 18/40 106/1.23 |
| 3,361,580 A | 1/1968 | Schneble, Jr. et al. | |
| 3,392,035 A | 7/1968 | Torigai et al. | |
| 3,436,233 A | 4/1969 | Jackson | |
| 3,453,123 A | 7/1969 | Merker et al. | |
| 3,649,308 A | 3/1972 | Gulla et al. | |
| 3,790,392 A | 2/1974 | Gilano | |
| 3,804,638 A | 4/1974 | Jonker et al. | |
| 2007/0284258 A1 * | 12/2007 | Yoshimoto ............... | C25D 3/38 205/263 |
| 2014/0178572 A1 * | 6/2014 | Chow ..................... | C23C 18/40 427/97.9 |
| 2015/0079276 A1 * | 3/2015 | Wismann ................ | C03C 17/10 427/123 |

FOREIGN PATENT DOCUMENTS

CN    102277567    *    7/2011

OTHER PUBLICATIONS

Molinstincts "Chemical formula of 4-chloro-2-benzooxazolinone (C7H4CINO2)", 2014, 3 pages.*
Molinstincts "Chemical formula for 2-Benzoxazolinone (C7H5NO2)", 2014, 3 pages.*

* cited by examiner

*Primary Examiner* — Katherine A Bareford
(74) *Attorney, Agent, or Firm* — John J. Piskorski

(57) ABSTRACT

Electroless copper plating compositions including (a) copper ions, (b) a complexing agent for copper ions, (c) a reducing agent, (d) a pH adjustor and (e) a stabilizer is disclosed. The stabilizer has a specific chemical structure, and contributes to stable an electroless copper plating composition from decomposition.

4 Claims, No Drawings

ELECTROLESS COPPER PLATING COMPOSITIONS

FIELD OF THE INVENTION

The present invention relates to electroless copper plating compositions. More particularly, the invention relates to electroless copper plating compositions comprising a stabilizer which enables the life of the copper plating compositions to be extended.

BACKGROUND OF THE INVENTION

Electroless copper plating compositions are in widespread use in metallization industries for depositing copper on various types of substrates. In the manufacture of printed wiring boards, for example, the electroless copper baths are used to deposit copper into through-holes and circuit paths as a base for subsequent electrolytic copper plating. Electroless copper plating also is used in the decorative plastics industry for deposition of copper onto non-conductive surfaces as a base for further plating of copper, nickel, gold, silver and other metals as required.

Electroless copper plating compositions often tend to spontaneously decompose after a certain period of time whether or not they are in active use. It is considered that small amounts of metallic copper nuclei generated in the plating compositions initiate a random deposition process, which inevitably decreases the overall stability of electroless copper plating composition and shortens the useful bath life. The metallic copper nuclei is formed by a disproportionation reaction of monovalent copper oxide ($Cu_2O$), which is generated by incomplete reduction of divalent copper ion ($Cu^{2\pm}$) because of poor stability of an electroless copper plating composition. Such decomposed electroless copper plating baths may result in poor quality deposited copper films with dark-colored appearance.

In order to solve the problem, many stabilizers for electroless copper plating baths were developed. See U.S. Pat. No. 3,257,215; U.S. Pat. No. 3,361,580; U.S. Pat. No. 3,649,308; U.S. Pat. No. 3,310,430; U.S. Pat. No. 3,095,309; U.S. Pat. No. 3,222,195; U.S. Pat. No. 3,392,035; U.S. Pat. No. 3,453,123; U.S. Pat. No. 3,903,907; U.S. Pat. No. 3,436,233; U.S. Pat. No. 3,790,392 and U.S. Pat. No. 3,804,638. However, some of the stabilizers disclosed in these patents cause other problems—such as low deposition rate of the electroless copper plating or poor copper deposited layers. Therefore, there remains a need for developing new stabilizers which prevent decomposition of the electroless copper plating bath and extend the bath life, without decreasing deposition rate and the quality of copper deposited layer.

SUMMARY OF THE INVENTION

One embodiment of the invention is an electroless copper plating composition comprising (a) copper ions, (b) a complexing agent for copper ions, (c) a reducing agent, (d) a pH adjustor and (e) a compound represented by the following formula (1)

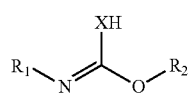

(1)

wherein $R_1$ and $R_2$ are independently selected from saturated or unsaturated hydrocarbon groups having 1 to 20 carbon atoms, in which one or more of the carbon atoms of the hydrocarbon groups may be replaced by a nitrogen atom or an oxygen atom, $R_1$ and $R_2$ can combine with each other to form a ring or a condensed ring, the hydrocarbon group may be substituted with an alkyl group, cycloalkyl group, alkoxy group, aryl group, heteroaryl group or halogen, and X is a hetero atom selected from sulfur atom or oxygen atom.

Another embodiment of the invention is a method for forming a copper film on a substrate comprising the step of: contacting a substrate with a composition comprising (a) copper ions, (b) a complexing agent for copper ions, (c) a reducing agent, (d) a pH adjustor and (e) a compound represented by the following formula (1),

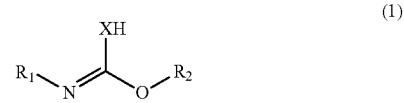

(1)

wherein $R_1$ and $R_2$ are independently selected from saturated or unsaturated hydrocarbon groups having 1 to 20 carbon atoms, in which one or more of the carbon atoms of the hydrocarbon groups may be replaced by nitrogen atom or oxygen atom, $R_1$ and $R_2$ can combine with each other and form a ring or a condensed ring, the hydrocarbon group may be substituted with an alkyl group, cycloalkyl group, alkoxy group, aryl group, heteroaryl group or halogen, and X is a hetero atom selected from sulfur atom or oxygen atom.

DETAILED DESCRIPTION OF THE INVENTION

As used throughout this specification, the abbreviations given below have the following meanings, unless the context clearly indicates otherwise; mg=milligram; ml=milliliter; L=liter; cm=centimeter; m=meter; mm=millimeter; μm=micron=micrometer; min.=minute(s); ppm=mg/L=parts per million; ° C.=degrees Centigrade; g/L=grams per liter; wt %=percent by weight; DI=deionized.

The terms "plating" and "deposition" are used interchangeably throughout the specification. The terms "plating composition", "plating bath" and "plating solution" are used interchangeably throughout the specification. All amounts are percent by weight, unless otherwise noted.

One embodiment of the present invention includes an electroless copper plating composition comprising a compound represented by the following formula (1)

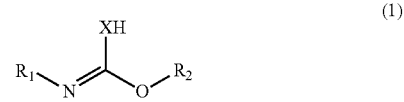

(1)

In the formula (1), $R_1$ and $R_2$ are independently selected from saturated or unsaturated hydrocarbon groups having 1 to 20 carbon atoms. Examples of the saturated or unsaturated hydrocarbon groups include, but are not limited to, alkyl groups such as methyl group, ethyl group, propyl group, n-butyl group, tert-butyl group, iso-butyl group, hexyl group, n-octyl group, tert-octyl group, decyl group, tetradecyl group, hexadecyl group and octadecyl group, cycloalkyl groups such as cyclohexyl group, aryl groups such as phenyl group, naphthalene group and biphenylene group, alkenyl groups, alkynyl groups and cycloalkenyl groups. One or more of the carbon atoms of the hydrocarbon groups may be replaced by nitrogen atom or oxygen atom. Examples of such groups include, but are not limited to, amino groups, heteroaryl groups and condensed heteroaryl groups. $R_1$ and $R_2$ can combine with each other to form a ring or a condensed ring. The hydrocarbon groups may be substituted with alkyl group, cycloalkyl group, alkoxy group, aryl group, heteroaryl group or halogen. X is a hetero atom selected from sulfur atom or oxygen atom. Preferably, X is sulfur atom.

When X of the formula (1) is a sulfur atom, formula (1) has a resonance represented by the following formula (3).

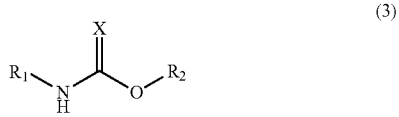

(3)

In the formula (3), $R_1$ and $R_2$ are same as described above.

When the compound represented by the formula (1) is included in an electroless copper plating bath, the bath stability is increased and decomposition speed is quite slow Preferably, $R_1$ and $R_2$ combine with each other to form a ring or a condensed ring. Such compounds are represented by the following formula (2).

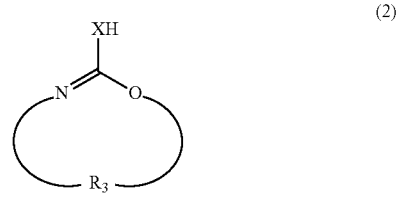

(2)

In the formula (2), $R_3$ is a saturated or unsaturated hydrocarbon group having 2 to 20 carbon atoms, in which one or more of the carbon atoms of the hydrocarbon group may be replaced by a heteroatom selected from nitrogen atom or oxygen atom. More preferably, at least one of the hydrocarbon groups is replaced by a heteroatom selected from nitrogen atom or oxygen atom to form a heteroaryl compound.

Examples of the compound represented by the formula (2) include, but are not limited to,

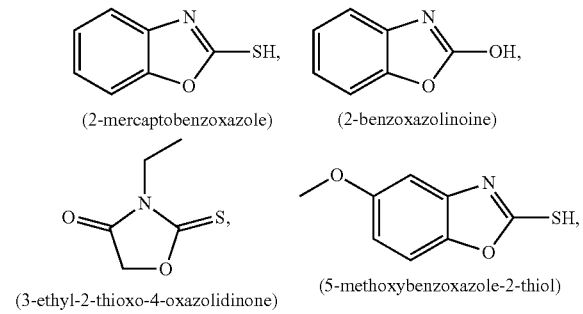

(2-mercaptobenzoxazole)  (2-benzoxazolinoine)

(3-ethyl-2-thioxo-4-oxazolidinone)  (5-methoxybenzoxazole-2-thiol)

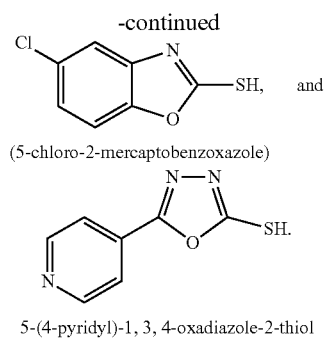

(5-chloro-2-mercaptobenzoxazole) and 5-(4-pyridyl)-1,3,4-oxadiazole-2-thiol

Preferably, the compound represented by the formula (2) is selected from mercaptobenzoxazole, 2-benzoxazolinone and 5-(4-pyridyl)-1,3,4-oxadiazole-2-thiol.

Mixtures of one or more of the compounds represented by the formula (1) may be used. The amount of the compound is normally from 0.01 ppm to 1000 ppm, preferably from 0.1 ppm to 10 ppm.

The electroless copper plating composition of the invention comprises copper ions. The sources of copper ions include, but are not limited to, water soluble halides, nitrates, acetates, sulfates and other organic and inorganic salts of copper. Mixtures of one or more of such copper salts may be used to provide copper ions. Examples include copper sulfate, such as copper sulfate pentahydrate, copper chloride, copper nitrate, copper hydroxide and copper sulfamate.

Conventional amounts of copper salts may be used in the compositions. One or more sources of copper ions may be included in the composition to provide copper ion concentrations in amounts of at least 0.5 g/L, preferably from 1 g/L to 30 g/L, more preferably from 1 g/L to 20 g/.

The electroless copper plating composition of the invention comprises one or more complexing agents for copper ions. Complexing agents work to prevent deposition of hydroxides of copper in the electroless copper plating composition. Examples of complexing agents include, but are not limited to, organic acids such as carboxylic acids and salts thereof. Such carboxylic acids include, but are not limited to: tartaric acid, citric acid, acetic acid, malic acid, malonic acid, ascorbic acid, oxalic acid, lactic acid, succinic acid and salts thereof. Such salts include alkali metal salts of the organic acids such as Rochelle salts which include potassium sodium tartrate, and dipotassium tartrate. Complexing agents may also include one or more of hydantoin and hydantoin derivatives such as 1-methylhydantoin, 1,3-dimethylhydantoin and 5,5-dimethylhydantoin, nitriloacetic acid and its alkali metal salts, triethanolamine, ethylenediaminetetraacetic acid (EDTA) and its alkali metal salts such as tetrasodium ethylenediaminetetraacetate, modified ethylene diamine tetraacetic acids such as N-hydroxyethylenediamine triacetate, hydroxyalkyl substituted dialkaline triamines such as pentahydroxy propyldiethylenetriamine and compounds such as N,N-dicarboxymethyl L-glutamic acid tetrasodium salt, S,S-ethylene diamine disuccinic acid and N,N,N',N'-tetrakis (2-hydroxypropyl) ethytlenediamine (ethylenedinitrilo) tetra-2-propanol. Preferably, the complexing agents are selected from tartrate and EDTA, and most preferably, the complexing agent is tartrate.

Inventors of the invention found that the combination of the compound represented by the formula (1) and tartrate shows excellent results for bath stability disclosed later.

Complexing agents may be included in the compositions in amounts of at least 0.5 g/L, preferably from 1 g/L to 150 g/L, more preferably from 10 g/L to 100 g/L, most preferably from 15 g/L to 50 g/L.

The electroless copper plating composition of the invention comprises one or more reducing agents. Examples of reducing agents include, but are not limited to, hypophosphite salts such as alkali metal hypophosphites such as sodium hypophosphite, sulfinate compounds such as sodium hydroxymethanesulfinate. Reducing agents also may include glyoxylic acid, formaldehyde, boron hydride salts and dimethylamine borane. Preferably, the reducing agent is formaldehyde. Reducing agents may be included in the compositions in amounts of at least 1 g/L, preferably from 5 g/L to 50 g/L, more preferably from 5 g/L to 30 g/L.

The electroless copper plating composition of the invention can comprise one or more pH adjustors. The pH adjustor is added in the electroless copper plating composition to adjust pH within a preferred range. Normally, alkaline compound can be used. Examples of pH adjustors include, but are not limited to, sodium hydroxide, potassium hydroxide, lithium hydroxide, tetramethyl ammonium hydroxide, triethanolamine and monoethanolamine. Typically sodium hydroxide, potassium hydroxide or mixtures thereof are used. Such alkaline compounds may be included in amounts to provide a pH range of 8 and greater, preferably the pH is 10 to 14, more preferably the pH is from 11 to 13.5.

Other additives may be included in the electroless copper compositions. Many of such additives are well known in the art. Such additives include, but are not limited to: surfactants, grain refiners, accelerators, antioxidants and suppressors.

Conventional surfactants may be included in the compositions. Such surfactants include ionic, such as cationic and anionic surfactants, non-ionic and amphoteric surfactants. Mixtures of the surfactants may be used. In general, surfactants may be included in conventional amounts for electroless copper plating compositions. Surfactants may be included in the compositions in amounts of 0.001 g/L to 50 g/L.

Cationic surfactants include, but are not limited to: tetraalkylammonium halides, alkyltrimethylammonium halides, hydroxyethyl alkyl imidazoline, alkylbenzalkonium halides, alkylamine acetates, alkylamine oleates and alkylaminoethyl glycine.

Anionic surfactants include, but are not limited to: alkylbenzenesulfonates, alkyl or alkoxy naphthalene sulfonates, alkyldiphenyl ether sulfonates, alkyl ether sulfonates, alkylsulfuric esters, polyoxyethylene alkyl ether sulfuric esters, polyoxyethylene alkyl phenol ether sulfuric esters, higher alcohol phosphoric monoesters, polyoxyalkylene alkyl ether phosphoric acids (phosphates) and alkyl sulfosuccinates.

Amphoteric surfactants include, but are not limited to: 2-alkyl-N-carboxymethyl or ethyl-N-hydroxyethyl or methyl imidazolium betaines, 2-alkyl-N-carboxymethyl or ethyl-N-carboxymethyloxyethyl imidazolium betaines, dimethylalkyl betains, N-alkyl-β-aminopropionic acids or salts thereof and fatty acid amidopropyl dimethylaminoacetic acid betaines.

Preferably the surfactants are non-ionic. Non-ionic surfactants include, but are not limited to: alkyl phenoxy polyethoxyethanols, polyoxyethylene polymers having from 20 to 150 repeating units and block and random copolymers of polyoxyethylene and polyoxypropylene.

Grain refiners are added to help to provide finer deposit surfaces with relatively higher reliability. Grain refiners include, but are not limited to: high molecular weight polymer compounds such as polyalkylene glycols, polyacrylamides, poly acrylates, polypropylene glycols and polyethylene glycols (PEG), and allantoin. The molecular weight of the high molecular weight polymer compounds are from 500 to 20,000. For example, PEG 600, PEG 2000, PEG 4000, PEG 6000 and PEG 10000 can be used. Grain refiners may be included in the compositions basically from 0.1 ppm to 300 ppm, preferably from 1 ppm to 100 ppm.

Accelerators are added to accelerate the plating process. Accelerators are also called promotors. Accelerators include, but are not limited to, organic salts such as ammonium salt and nitric acid salt. Accelerators may be included in the compositions in conventional amounts typically used for electroless copper compositions.

Antioxidants include, but are not limited to: monohydric, dihydric and trihydric phenols in which a hydrogen atom or atoms may be unsubstituted or substituted by —COOH, —SO$_3$H, lower alkyl or lower alkoxy groups, hydroquinone, catechol, resorcinol, quinol, pyrogallol, hydroxyquinol, phloroglucinol, guaiacol, gallic acid, 3,4-dihydroxybenzoic acid, phenolsulfonic acid, cresolsulfonic acid, hydroquinonsulfonic acid, catecholsulfonic acid and salts thereof. Antioxidants may be included in the compositions in conventional amounts typically used for electroless copper compositions.

Suppressors are added in electroless copper plating composition to control its plating rate. Sometimes suppressors work similar to stabilizers in electroless copper plating composition, and well known in the arts. Suppressors may be included in the compositions in conventional amounts typically used for electroless copper compositions.

Optionally, the electroless copper plating composition of the invention includes other stabilizers typically used for electroless copper compositions. Examples of such stabilizers include, but are not limited to, sulfur containing compounds such as mercaptosuccinic acid, dithiodisuccinic acid, mercaptopyridine, mercaptobenzothiazole, thiourea and thiourea derivatives; compounds such as pyridine, purine, quinoline, indole, indazole, imidazole, pyrazine and their derivatives; alcohols such as alkyne alcohols, allyl alcohols, aryl alcohols and cyclic phenols; hydroxy substituted aromatic compounds such as methyl-3,4,5-trihydroxybenzoate, 2,5-dihydroxy-1,4-benzoquinone and 2,6-dihydroxynaphthalene; amines; amino acids; aqueous soluble metal compounds such as metal chlorides and sulfates; silicon compounds such as silanes, siloxanes and low to intermediate molecular weight polysiloxanes; germanium and its oxides and hydrides; and polyalkylene glycols, cellulose compounds, alkylphenyl ethoxylates and polyoxyethylene compounds; and stabilizers such as pyridazine, methylpiperidine, 1,2-di-(2-pyridyl)ethylene, 1,2-di-(pyridyl)ethylene, 2,2'-dipyridylamine, 2,2'-bipyridyl, 2,2'-bipyrimidine, 6,6'-dimethyl-2,2'-dipyridyl, di-2-pyrylketone, N,N,N',N'-tetraethylenediamine, naphthalene, 1,8-naphthyridine, 1,6-naphthyridine, tetrathiafurvalene, terpyridine, pththalic acid, isophthalic acid and 2,2'-dibenzoic acid. Such additives may be included in the electroless copper compositions in amounts of 0.01 ppm to 1000 ppm, preferably from 0.05 ppm to 100 ppm, more preferably from 1 ppm to 30 ppm.

The electroless copper compositions may be used to deposit copper on both conductive and non-conductive substrates. The electroless compositions may be used in many conventional methods known in the art. Typically copper deposition is done at temperatures of 20° C. to 80° C. Preferably the electroless compositions deposit copper at temperatures of 30° C. to 60° C. The substrate to be plated with copper is immersed in the electroless composition or the electroless composition is sprayed onto the substrate. Conventional plating times may be used to deposit the copper onto the substrate. Deposition may be done for 5 seconds to 30 minutes; however, plating times may vary depending on the thickness of the copper desired on the substrate and the plating bath temperature. Copper plating rates may range from 0.01 μm/10 minutes to 5 μm/10 minutes, preferably from 0.1 μm/10 minutes to 2 μm/10 minutes.

Substrates include, but are not limited to: materials including inorganic and organic substances such as glass, ceramics, porcelain, resins, paper, cloth and combinations thereof. Metal-clad and unclad materials also are substrates which may be plated with the electroless copper compositions.

Substrates also include printed circuit boards. Such printed circuit boards include metal-clad and unclad boards with thermosetting resins, thermoplastic resins and combinations thereof, including fiber, such as fiberglass, and impregnated embodiments of the foregoing.

Thermoplastic resins include, but are not limited to: acetal resins, acrylics, such as methyl acrylate, cellulosic resins, such as ethyl acetate, cellulose propionate, cellulose acetate butyrate and cellulose nitrate, polyethers, nylon, polyethylene, polystyrene, styrene blends, such as acrylonitrile styrene and copolymers and acrylonitrile-butadiene styrene copolymers, polycarbonates, polychlorotrifluoroethylene, and vinylpolymers and copolymers, such as vinyl acetate, vinyl alcohol, vinyl butyral, vinyl chloride, vinyl chloride-acetate copolymer, vinylidene chloride and vinyl formal.

Thermosetting resins include, but are not limited to: allyl phthalate, furane, melamine-formaldehyde, phenol-formaldehyde and phenol-furfural copolymers, alone or compounded with butadiene acrylonitrile copolymers or acrylonitrile-butadiene-styrene copolymers, polyacrylic esters, silicones, urea formaldehydes, epoxy resins, allyl resins, glyceryl phthalates and polyesters.

The electroless copper compositions may be used to plate both low and high $T_g$ resins. Low $T_g$ resins have a $T_g$ below 160° C. and high $T_g$ resins have a $T_g$ of 160° C. and above. Typically high $T_g$ resins have a $T_g$ of 160° C. to 280° C. or such as from 170° C. to 240° C. High $T_g$ polymer resins include, but are not limited to: polytetrafluoroethylene (PTFE) and polytetrafluoroethylene blends. Such blends include, for example, PTFE with polyphenylene oxides and cyanate esters. Other classes of polymer resins which include resins with a high $T_g$ include, but are not limited to: epoxy resins, such as difunctional and multifunctional epoxy resins, bimaleimide/triazine and epoxy resins (BT epoxy), epoxy/polyphenylene oxide resins, acrylonitrile butadienes-tyrene, polycarbonates (PC), polyphenylene oxides (PPO), polypheneylene ethers (PPE), polyphenylene sulfides (PPS), polysulfones (PS), polyamides, polyesters such as polyethyleneterephthalate (PET) and polybutyleneterephthalate (PBT), polyetherketones (PEEK), liquid crystal polymers, polyurethanes, polyetherimides, epoxies and composites thereof.

The electroless compositions may be used to deposit copper on walls of through-holes or vias of printed circuit board substrates as well as other parts of the boards. The electroless compositions may be used in both horizontal and vertical processes of manufacturing printed circuit boards.

In general, the boards may be rinsed with water and cleaned and degreased followed by desmearing the through-hole walls. Typically prepping or softening the dielectric or desmearing of the through-holes begins with application of a solvent swell. Any conventional solvent swell may be used. The specific type may vary depending on the type of dielectric material. Minor experimentation may be done to determine which solvent swell is suitable for a particular dielectric material. Solvent swells include, but are not limited to: glycol ethers and their associated ether acetates. Examples of commercially available solvent swells are CIRCUPOSIT™ Conditioner 3302A, CIRCUPOSIT™ Hole Prep 3303 and CIRCUPOSIT™ Hole Prep 4120 solutions available from Dow Electronic Materials.

After the solvent swell, a promoter may be applied. Conventional promoters may be used. Such promoters include sulfuric acid, chromic acid, alkaline permanganate or plasma etching. Typically alkaline permanganate is used as the promoter. Examples of commercially available promoters are CIRCUPOSIT™ Promoter 4130 and CIRCUPOSIT™ MLB Promoter 3308 solutions available from Dow Electronic Materials. Optionally, the substrate and through-holes are rinsed with water.

A neutralizer may then be applied to neutralize any residues left by the promoter. Conventional neutralizers may be used. Typically the neutralizer is an aqueous acidic solution containing one or more amines or a solution of 3 wt % hydrogen peroxide and 3 wt % sulfuric acid. An example of a commercially available neutralizer is CIRCUPOSIT™ MLB Neutralizer 216-5. Optionally, the substrate and through-holes are rinsed with water and then dried.

After neutralizing an acid or alkaline conditioner is applied. Conventional conditioners may be used. Such conditioners may include one or more cationic surfactants, non-ionic surfactants, complexing agents and pH adjusters or buffers. Examples of commercially available acid conditioners are CIRCUPOSIT™ Conditioners 3320A and 3327 solutions available from Dow Electronic Materials. Suitable alkaline conditioners include, but are not limited to: aqueous alkaline surfactant solutions containing one or more quaternary amines and polyamines. Examples of commercially available alkaline surfactants are CIRCUPOSIT™ Conditioner 231, 3325, 813 and 860 formulations. Optionally, the substrate and through-holes are rinsed with water.

Conditioning may be followed by micro-etching. Conventional micro-etching compositions may be used. Micro-etching is designed to provide a micro-roughened metal surface on exposed metal (e.g. innerlayers and surface etch) to enhance subsequent adhesion of plated electroless metal and later electroplate. Micro-etches include, but are not limited to: 60 g/L to 120 g/L sodium persulfate or sodium or potassium oxymonopersulfate and sulfuric acid (2%) mixture, or generic sulfuric acid/hydrogen peroxide. Examples of commercially available micro-etching compositions are CIRCUPOSIT™ Microetch 3330 Etch solution and PREPOSIT™ 748 Etch solution available from Dow Electronic Materials. Optionally, the substrate is rinsed with water.

Optionally, a pre-dip may then applied to the micro-etched substrate and through-holes. Pre-dips include, but are not limited to: organic salts such as sodium potassium tartrate or sodium citrate, 0.5% to 3% sulfuric acid or an acidic solution of 25 g/L to 75 g/L sodium chloride.

A catalyst may then be applied to the substrate. Conventional catalysts may be used such as conventional tin/palladium colloidal catalysts. Commercially available catalysts include, but are not limited to: CATAPOSIT™ 44 and CATAPOSIT™ 404 catalyst formulations available from Dow Electronic Materials. Application may be done by conventional methods used in the art, such as immersing the substrate in a solution of the catalyst or by spraying or by atomization using conventional apparatus. Catalyst dwell time may range from 1 minute to 10 minutes, typically from 2 minutes to 8 minutes for vertical equipment and for 25 seconds to 120 seconds for horizontal equipment. The catalysts may be applied at temperatures from room temperature to 80° C., typically from 30° C. to 60° C. The substrate and through-holes optionally may be rinsed with water after application of the catalyst.

The substrate and walls of the through-holes are then electrolessly plated with copper using the electroless copper composition. Plating times and temperatures may be conventional. Typically copper deposition may be done at temperatures of 20° C. to 80° C., more typically from 30° C. to 60° C. The substrate may be immersed in the electroless plating composition or the electroless composition may be sprayed onto the substrate. Typically, electroless plating may be done for 5 seconds to 30 minutes; however, plating times may vary depending on the thickness of the metal desired. Plating is done in an alkaline environment to prevent undesired corrosion of any metal cladding on the substrate.

Optionally anti-tarnish may be applied to the metal. Conventional anti-tarnish compositions may be used. An example of anti-tarnish is ANTI TARNISH™ 7130 solution available from Dow Electronic Materials. The substrate may optionally be rinsed with water and then the boards may be dried.

After the substrate is plated with copper, the substrates may undergo further processing. Further processing may include conventional processing by photoimaging and further metal deposition on the substrates such as electrolytic metal deposition of, for example, copper, copper alloys, tin and tin alloys.

The electroless copper compositions provide alternative reducing agents which enable the exclusion of many conventional reducing agents and yet are stable during storage as well as during copper deposition. Failure to observe copper oxide formation is one indication of composition stability. Additionally, reductant stability can be assessed by examining the plating rates of compositions before and after idling for several hours. For a composition that is stable, substantially the same plating rates are observed before and after idling. The electroless copper compositions provide uniform copper deposits which have a substantially uniform pink and smooth appearance, and generally meet industry standards desired for commercially acceptable electroless copper baths. The electroless copper compositions also plate copper at commercially acceptable rates. Exclusion of conventional environmentally unfriendly reducing agents enables an environmentally friendly electroless copper plating composition.

EXAMPLES

The following examples are not intended to limit the scope of the invention but to further illustrate embodiments of the present invention. All parts and percentages are by weight unless otherwise indicated.

Examples 1-15

Stability Test

Stability test was conducted to check the performance of stabilizers to stabilize an electroless copper plating bath for a certain time (22 and 44 hours) at various bath temperatures (50° C. and 40° C.).

2-mercaptobenzoxazole (inventive examples), 5-(4-pyridyl)-1,3,4-oxadiazole-2-thiol (inventive examples), thiourea (comparative examples) and 2-mercaptobenzothiazole (comparative examples) were used as stabilizers. 2,2'-dipyridyl was also used as stabilizer to realize basic stability of electroless copper plating solution. The solution formulation is listed in Tables 1 and 2.

One hundred (100) ml of solution was prepared in a bottle according to the formulation shown in Tables 1 and 2. Each bottle was stored in a water bath at the temperature shown in Table 2. The copper content after stored about 22 and 44 hours were analyzed, and the results are also listed in Table 2. The copper content remained in the electroless copper plating solution was analyzed by titration described below.

Titration Method

1) Cool bath sample to room temperature. Pipette 10 ml of cooled sample (free of precipitated copper) into a 250 ml conical flask and add 15 ml of 2.5% sulfuric acid solution.
2) Add around 3 g of sodium persulphate to the mixture.
3) Heat to boiling and hold for two minutes.
4) Add 50 ml of deionized water and 25 ml of 200 g/L ammonium acetate solution. Warm to approximately 40° C.
5) Add 3 drops of PAR indicator and titrate with EDTA (0.05M) from grey-pink to the grey-green end-point.
6) The resulting copper content can be calculated as the following formula:

Copper (g/L)=[ml of EDTA*Molarity of EDTA*63.54]/Aliquot (10 ml)

TABLE 1

| | |
|---|---|
| $Cu^{2+}$(from $CuSO_4$) | 2.5 g/L |
| Chelating agent | EDTA (30 g/L) or Rochelle salt(45 g/L) |
| Sodium hydroxide (NaOH) | 8 g/L |
| Formaldehyde (HCHO) | 3 g/L |
| 2,2'-Dipyridyl | 5 ppm |
| Stabilizers | 2-Mercaptobenzoxazole, 5-(4-pyridyl)-1,3,4-oxadiazole-2-thiol, Thiourea or 2-mercaptobenzothiazole 0.1-1.0 ppm |

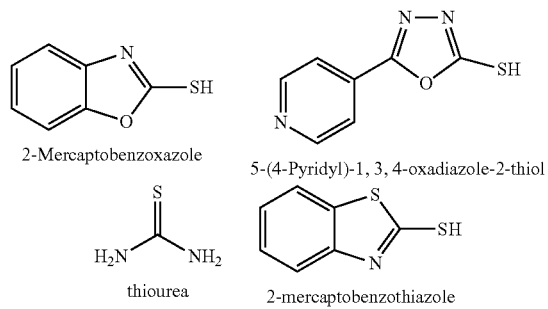

TABLE 2

| Ex No | Additive Name | (ppm) | Chelating agent | Temp (° C.) | Remain Cu after 22 hr (%) | Remain Cu after 44 hr (%) |
|---|---|---|---|---|---|---|
| 1 | 2-mercaptobenzoxazole | 0.5 | EDTA | 50 | 92 | 72 |
| 2 | 2-mercaptobenzoxazole | 1.0 | EDTA | 50 | 99 | 99 |
| 3 | 2-mercaptobenzoxazole | 0.1 | Tartrate | 40 | 90 | 71 |
| 4 | 2-mercaptobenzoxazole | 0.5 | Tartrate | 40 | 94 | 83 |
| 5 | 2-mercaptobenzoxazole | 1.0 | Tartrate | 40 | 96 | 91 |
| 6 | 5-(4-pyridyl)-1,3,4- | 0.5 | EDTA | 50 | 100 | 100 |

TABLE 2-continued

| Ex No | Additive Name | (ppm) | Chelating agent | Temp (° C.) | Remain Cu after 22 hr (%) | Remain Cu after 44 hr (%) |
|---|---|---|---|---|---|---|
| | oxadiazole-2-thiol | | | | | |
| 7 | 5-(4-pyridyl)-1,3,4-oxadiazole-2-thiol | 1.0 | EDTA | 50 | 100 | 100 |
| 8 | 5-(4-pyridyl)-1,3,4-oxadiazole-2-thiol | 0.5 | Tartrate | 40 | 100 | 69 |
| 9 | 5-(4-pyridyl)-1,3,4-oxadiazole-2-thiol | 1.0 | Tartrate | 40 | 100 | 96 |
| 10 | Thiourea | 0.5 | Tartrate | 40 | 42 | 33 |
| 11 | Thiourea | 1.0 | Tartrate | 40 | 28 | 27 |
| 12 | 2-mercaptobenzothiazole | 0.5 | Tartrate | 40 | 0 | 0 |
| 13 | 2-mercaptobenzothiazole | 1.0 | Tartrate | 40 | 11 | 11 |
| 14 | — | — | EDTA | 50 | 37 | 33 |
| 15 | — | — | Tartrate | 40 | 0 | 0 |

Examples 16-30

Crash Test

Crash test was conducted to check the performance of stabilizers when palladium catalyst was added in the bath. This test mainly aimed at simulating the effects of palladium contamination in an electroless copper plating solution Palladium contamination is considered as a major cause that lead to decomposition of electroless copper plating solutions. Therefore, the condition was the same as those of Examples 1 to 10 except for 2 ml of 0.2% CATAPOSIT™ 44 Catalyst in 200 g/L sodium chloride solution was added in the solutions. The temperature and time of electroless copper plating solutions were the same as Examples 1 to 10. The formulation of each Example and the results are shown in Table 3.

TABLE 3

| Ex No | Additive Name | (ppm) | Chelating agent | Temp (° C.) | Remain Cu after 22 hr (%) | Remain Cu after 44 hr (%) |
|---|---|---|---|---|---|---|
| 16 | 2-mercaptobenzoxazole | 0.1 | EDTA | 50 | 93 | 56 |
| 17 | 2-mercaptobenzoxazole | 0.5 | EDTA | 50 | 99 | 99 |
| 18 | 2-mercaptobenzoxazole | 1.0 | EDTA | 50 | 100 | 99 |
| 19 | 2-mercaptobenzoxazole | 0.5 | Tartrate | 40 | 91 | 63 |
| 20 | 2-mercaptobenzoxazole | 1.0 | Tartrate | 40 | 94 | 62 |
| 21 | 5-(4-pyridyl)-1,3,4-oxadiazole-2-thiol | 0.5 | Tartrate | 40 | 100 | 81 |
| 22 | 5-(4-pyridyl)-1,3,4-oxadiazole-2-thiol | 1.0 | Tartrate | 40 | 98 | 92 |
| 23 | Thiourea | 0.5 | Tartrate | 40 | 16 | 0 |
| 24 | Thiourea | 1.0 | Tartrate | 40 | 19 | 0 |
| 25 | 2-mercaptobenzothiazole | 0.5 | EDTA | 50 | 88 | 41 |
| 26 | 2-mercaptobenzothiazole | 1.0 | EDTA | 50 | 95 | 92 |
| 27 | 2-mercaptobenzothiazole | 0.5 | Tartrate | 40 | 0 | 0 |
| 28 | 2-mercaptobenzothiazole | 1.0 | Tartrate | 40 | 21 | 17 |
| 29 | — | — | EDTA | 50 | 0 | 0 |
| 30 | — | — | Tartrate | 40 | 0 | 0 |

Examples 31-33

Deposition Rate Test

Deposition rate test was conducted to check the effect of stabilizers for deposition rate and deposition color of electroless copper plating solution. The process flow for electroless plating is listed in Table 4. The deposition rate of the plating solution was measured by determining the amount of copper deposition using the following titration method. The results are shown in Table 5.

Analysis of Deposition Rate
1) Place a 5 cm square (5 cm×5 cm) plated panel in a 500 ml beaker.
2) Add 25 ml of pH 10 ammonia buffer and 3 drops of hydrogen peroxide (35%)
3) Dissolve all the deposit on the panel.
4) Add 25 ml of DI water.
5) Add 3 drops of PAN indicator and titrate with 0.05M EDTA to green end point.
6) The calculation of plating thickness was according to the following formula: Plating Thickness (um)=(ml of EDTA*Molarity of EDTA*63.54*10)/(8.92*total panel area in $cm^2$).

TABLE 4

| Steps | Chemicals | Temp. | Process Time | Rinse Time |
|---|---|---|---|---|
| Sweller | 11.5% Cuposit™ Z 12.5% Circuposit™ MLB Conditioner 211 | 75° C. | 5 min | 3 min |
| Oxidizer | 15% Cuposit™ Z 10% Circuposit™ MLB Promoter 213A-1 | 80° C. | 10 min | 3 min |
| Neutralizer | 5% Circuposit™ MLB Neutralizer 216-5 | 40° C. | 5 min | 3 min |
| Conditioner | 4% Circuposit™ Conditioner 3323A | 40° C. | 5 min | 4 min |
| Microetch | 2% $H_2SO_4$ 100 g/L NaPS | R.T. | 1 min | 3 min |
| Predip | 250 g/L Cataposit™ 404 | R.T. | 1 min | |
| Catalyst | 250 g/L Cataposit™ 404 3% Caposit™ 44 | 40° C. | 5 min | 2 min |
| Accelerator | 1.5% Accelerator 19E | R.T. | 30 sec | 1 min |
| Els Cu | Els Cu | 43° C. | 5 min | 3 min |

TABLE 5

| Ex No | Additive Name | (ppm) | Chelating agent | Temp (° C.) | Deposition Rate in 5 min (um) | Deposition Color |
|---|---|---|---|---|---|---|
| 31 | / | 0 | EDTA | 43 | 0.63 | Salmon pink |
| 32 | 2-mercaptobenzoxazole | 0.5 | EDTA | 43 | 0.83 | Salmon pink |
| 33 | 2-mercaptobenzoxazole | 1.0 | EDTA | 43 | 0.85 | Salmon pink |

What is claimed is:

1. An electroless copper plating composition comprising (a) a copper ion, (b) a complexing agent for copper ion, (c) a reducing agent, (d) a pH adjustor and (e) a stabilizer compound chosen from one or more of 3 ethyl-2-thioxo-4-oxazolidinone and 5-(4-pyridyl)-1,3,4-oxadiazole-2-thiol.

2. The electroless copper plating composition of claim 1, wherein the amount of the stabilizer compound is from 0.01 to 1000 ppm.

3. The electroless copper plating composition of claim 1, wherein the complexing agent is tartrate.

4. A method for forming a copper film on a substrate comprising the step of: contacting a substrate with a composition comprising (a) a copper ion, (b) a complexing agent for copper ion, (c) a reducing agent, (d) a pH adjustor and (e) a stabilizer compound chosen from one or more of 3-ethyl-2-thioxo-4-oxazolidinone and 5-(4-pyridyl)-1,3,4-oxadiazole-2-thiol.

\* \* \* \* \*